(12) United States Patent
Pepperell et al.

(10) Patent No.: US 11,212,502 B2
(45) Date of Patent: Dec. 28, 2021

(54) METHOD OF MODIFYING AN IMAGE ON A COMPUTATIONAL DEVICE

(71) Applicant: FOVO TECHNOLOGY LIMITED, Cardiff (GB)

(72) Inventors: Robert Pepperell, Cardiff (GB); Alistair Burleigh, Cardiff (GB)

(73) Assignee: FOVO TECHNOLOGY LIMITED, Cardiff (GB)

( * ) Notice: Subject to any disclaimer, the term of this patent is extended or adjusted under 35 U.S.C. 154(b) by 0 days.

(21) Appl. No.: 16/645,163

(22) PCT Filed: Aug. 20, 2018

(86) PCT No.: PCT/GB2018/052352
§ 371 (c)(1),
(2) Date: Mar. 6, 2020

(87) PCT Pub. No.: WO2019/048819
PCT Pub. Date: Mar. 14, 2019

(65) Prior Publication Data
US 2021/0037225 A1 Feb. 4, 2021

(30) Foreign Application Priority Data
Sep. 6, 2017 (GB) .................................... 1714341

(51) Int. Cl.
*G06T 15/00* (2011.01)
*H04N 13/128* (2018.01)
(Continued)

(52) U.S. Cl.
CPC ....... *H04N 13/128* (2018.05); *G06F 3/04883* (2013.01); *H04N 13/111* (2018.05); *H04N 13/366* (2018.05); *H04N 2013/0081* (2013.01)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS 8,218,895 B1 7/2012 Gleicher et al.
2008/0199049 A1 8/2008 Daly
(Continued)

FOREIGN PATENT DOCUMENTS

WO 2009/018557 A1 2/2009
WO WO 2014/122477 * 2/2014 ............... G06T 3/00
WO 2014/122477 A1 8/2014

OTHER PUBLICATIONS

Baldwin, J., et al., "The Perceived Size and Shape of Objects in Peripheral Vision," i-Perception, vol. 7, No. 4, pp. 1-23 (Jul. 1, 2016).
(Continued)

*Primary Examiner* — Gordon G Liu
(74) *Attorney, Agent, or Firm* — Polsinelli PC; Elton F. Dean, III

(57) ABSTRACT

A method of modifying an image on a computational device and a system for implementing the method is disclosed. The method comprising the steps of: providing image data representative of at least a portion of a three-dimensional scene, the scene being visible to a human observer from a viewing point when fixating on a visual fixation point within the scene; displaying an image by rendering the image data on a display device; capturing user input by user input capturing means; modifying the image by: computationally isolating a fixation region within the image, the fixation region being defined by a subset of image data representing an image object within the image, wherein the image object is associated with the visual fixation point; spatially reconstructing the subset of image data to computationally expand
(Continued)

the fixation region; spatially reconstructing remaining image data relative to the subset of image data to computationally compress a peripheral region of the image relative to the fixation region in a progressive fashion as a function of a distance from the fixation region, wherein the modification of the image is modulated by the user input such that a modified image is produced which synthetically emulates how the human observer would perceive the three-dimensional scene.

19 Claims, 12 Drawing Sheets

(51) Int. Cl.
*H04N 13/111* (2018.01)
*H04N 13/366* (2018.01)
*G06F 3/0488* (2013.01)
*H04N 13/00* (2018.01)

(58) Field of Classification Search
USPC .......................................................... 345/419
See application file for complete search history.

(56) References Cited

U.S. PATENT DOCUMENTS

| | | |
|---|---|---|
| 2012/0147133 A1 | 6/2012 | Hadwiger et al. |
| 2014/0125761 A1 | 5/2014 | Morimura et al. |
| 2014/0208263 A1 | 7/2014 | Maklouf |
| 2014/0247277 A1 | 9/2014 | Guenter |
| 2015/0309571 A1* | 10/2015 | Cheng ................... G06F 3/013 345/419 |
| 2015/0363905 A1* | 12/2015 | Pepperell ................ G06T 3/40 345/427 |
| 2017/0011492 A1 | 1/2017 | Thunstrom |
| 2018/0357749 A1 | 12/2018 | Young |
| 2019/0116353 A1* | 4/2019 | Lodato .................. A61B 3/024 |

OTHER PUBLICATIONS

Pepperell, R., The Perception of Art and the Science of Perception, Visual Communications and Image Processing, vol. 8291, pp. 829113-12 (Feb. 9, 2012).
International Search Report of PCT/GB2018/052352 dated Oct. 19, 2018.
Written Opinion of PCT/GB2018/052352 dated Oct. 19, 2018.
Search Report for Great Britain Patent Application No. GB1714341.3 dated Jul. 13, 2018.
U.S. Non-Final Office Action issued in corresponding U.S. Appl. No. 16/645,271, dated Feb. 9, 2021, 24 pages.
Cha Zhang et al.: 'Improving depth perception with motion parallax and its application in teleconferencing'; MMSP'09, Oct. 5-7, 2009.
Zhu Zhe et al.: '3D modelling and motion parallax for improved videoconferencing' vol. 2, No. 2, Jun. 2016, 131-142.
European Office Action dated Oct. 14, 2021 for corresponding European Patent Application No. 18759712.5, 6 pages.

* cited by examiner

METHOD OF MODIFYING AN IMAGE ON A COMPUTATIONAL DEVICE

The present invention relates to a method of modifying an image on a computational device. In particular, the invention relates to a method for modifying still and moving images recorded from cameras on computational devices.

Computational devices equipped with cameras, sensors and touchscreens, such as photographic cameras, movie cameras, smartphones, and tablets, are increasingly being used to record and manipulate photographs and movies. Conventional optical and image processing methods used in such devices generally rely on the geometry of linear perspective to map the light rays from the three dimensional (3D) world entering the lens or lenses mounted on the devices to a two-dimensional (2D) image plane. The computational device can modify various properties of this linear perspective 2D image by using standard optical, geometrical and image processing methods. For example, the 2D image can be zoomed, cropped, warped, stretched, rotated or filtered in order to satisfy the requirements of the user by applying user-controlled algorithms or other processes known by those skilled in the art.

However, there are a number of problems and limitations associated with camera devices that rely on linear perspective to capture and display images of the 3D world. Linear perspective operates on the principle that light rays travel in straight lines through a pinhole in a light barrier to be projected onto an image plane. For narrow angles of view (<30° horizontally) the appearance of any object as projected onto the image plane and rendered to a display according to the geometry of linear perspective is relatively unaffected by geometric distortion. However, a limitation with images of narrow angles of view is that large areas of the scene being imaged are cropped, and so not recorded in the image. As the angle of view is increased (>60° horizontally) then more of the scene can be recorded in the image, but due to the geometry of linear perspective objects at the edges of the image will start to become increasingly stretched and objects at the centre will start to be minified in a way that appears for many people perceptually unnatural. As the angle of view is increased further (>100° horizontally) the above noted distortions will become more severe, to the point where images of angles of view of >160° horizontally will be increasingly illegible.

Other methods can be used to obtain wide-angle views of 3D scenes that avoid the distortions associated with standard linear perspective projections. These include the use of fisheye lenses, 360° lenses, and panoramas. However, all these methods introduce different kinds of distortion, which is not desired and disturbs accuracy of the mapping between the real 3D scene and the computer image. Distortion problems with such methods can be reduced if the image is mathematically projected onto a spherical or curved surface and viewed using an appropriate interface, such that the user can scan around the image while seeing a cropped portion of the image in a more naturalistic perspective, as is the case in 360° videos and similar technologies. But these methods revive the problem of restricting the view of a scene to a narrow angle within the frame of the viewing device.

In theory, wide-angled images generated using the principles of linear perspective could appear undistorted if the image were to be viewed from a sufficiently close distance, that is, at the correct centre of projection of the light rays. The reason is that at this point the pattern of light rays reaching the retina of the viewer would closely match the pattern of light paths than would be projected from the real scene. However, in most practical situations, and especially for wide-angle images, the correct centre of projection is too close to the image surface for the normal human eye to focus comfortably. Therefore, linear perspective projections are not a viable method for accurately or comfortably depicting objects in wide angled views.

In whatever way they are viewed, non-stereoscopic images generated according to the principles of linear perspective characteristically appear flat when compared to our experience of the 3D real world they represent. This is for several reasons, including the fact that the depth cues in the image (such as occlusion, parallax, shading, etc.) are suppressed by the cues showing the image is flat (such as the geometry of the image plane, surface glare from the screen, etc.). A further reason is that the organisation of the visual space in images generated by conventional geometric methods is not perceptually natural, as noted above, so limiting the amount of depth perceived in the image.

Computational devices equipped with cameras and touchscreens, or cameras equipped with computational hardware and touchscreens, are increasingly being used to make images that emulate the first-person point of view. However, the spatial structure of the 3D world experienced by a person with normal binocular vision of their own point of view is substantially different in structure from images generated by conventional methods, that is, linear perspective or fisheye lens projection. It is known that the perceptual structure of visual space cannot be represented on an image plane using the geometrical laws of linear perspective, which limits any device reliant on those laws from effectively representing that structure.

Computational devices equipped with cameras are increasingly being further equipped with systems that permit the capture of 3D depth information from the scene, whether this is through the provision of additional cameras, light field capture systems, laser or infra-red measuring systems, time of flight systems, depth from motion systems, or other systems. The addition of 3D depth data can, in principle, lead to improvements in the perceptual naturalness, perceived depth of images as it allows greater ability to simulate the appearance of objects in natural vision and to computationally manipulate the spatial properties of the image. However, current systems using depth capture technology tend to rely on the geometry of linear perspective to project the resulting 3D images to the 2D display on the device, thus reviving the limitations noted above.

Furthermore, conventional user interfaces on smartphones and tablets, or other computational image capture devices equipped with touchscreens, do not allow the user to manipulate the spatial, depth and properties of images in a way that overcomes the problems or limitations noted above, in order to generate images that are more perceptually natural than those created or projected according to conventional projective geometry.

There is a need for a method that allows a user of a computational device equipped with a camera and a touchscreen to take a photograph or moving image of a 3D scene, whether using 2D or 3D depth data, that can be manipulated in such a way as to improve the perceptual naturalness, perceived depth and effectiveness of the first-person viewpoint compared to current methods.

U.S. patent application Ser. No. 14/763,454 discloses a method of making an image of a scene (including a scene made by the method) generally corresponding to that perceived by the human brain via the human eyes, the method including the steps, in any suitable order, of: capturing, recording, generating, or otherwise representing a scene consisting of the entire field of view, or part thereof, visible to a human observer from a given 'Viewing Point' (VP) when fixating on a given region within the scene, progressively enlarging the image towards the area of the scene, and progressively compressing the area of the scene corresponding to the peripheral field of vision to thereby produce a modified image of the scene generally corresponding to how the scene would appear to the human perceiver.

It is an object of the present invention to provide a technical solution to at least some of the issues outlined above.

In accordance with a first aspect of the present invention, there is provided a method of modifying an image on a computational device, the method comprising the steps of: providing image data representative of at least a portion of a three-dimensional scene, the scene being visible to a human observer from a viewing point when fixating on a visual fixation point within the scene; displaying an image by rendering the image data on a display device; capturing user input by user input capturing means; modifying the image by:

computationally isolating a fixation region within the image, the fixation region being defined by a subset of image data representing an image object within the image, wherein the image object is associated with the visual fixation point;

spatially reconstructing the subset of image data to computationally expand the fixation region;

spatially reconstructing remaining image data relative to the subset of image data to computationally compress a peripheral region of the image relative to the fixation region in a progressive fashion as a function of a distance from the fixation region, wherein the modification of the image is modulated by the user input such that a modified image is produced which synthetically emulates how the human observer would perceive the three-dimensional scene.

In an embodiment, modifying the image may further comprise rotating the image around an axis of the fixation region.

In an embodiment, modifying the image may further comprise applying a geometrical transformation to the image.

In an embodiment, modifying the image may further comprise altering an angle of view of the image in a horizontal or vertical axis of the image.

In an embodiment, the fixation region may be computationally expanded by an amount positively correlated with the angle of view of the user.

In an embodiment, the peripheral region may be computationally compressed by an amount inversely correlated with the angle of view of the user.

In an embodiment, the user input may comprise motion data representing a motion of the user relative to the display device. Modifying of the image may comprise statically positioning the fixation region relative to a border of the image and moving the peripheral region relative to the fixation region in accordance with the motion of the user so as to emulate a motion parallax perceived by the human observer in the three-dimensional scene. Modifying of the image may comprise computationally isolating the fixation region in response to an indication gesture of the user. Capturing of the user input may comprise monitoring a movement of the eyes of the user which corresponds to a repositioning of the fixation point within the three dimensional scene and modifying the image comprises computationally isolating the fixation region comprising a repositioned fixation point.

Capturing of the user input may comprise monitoring touch gestures on a touchscreen of the display device which correspond to a repositioning of the fixation point within the three dimensional scene and modifying the image comprises isolating the fixation region comprising a repositioned fixation point.

In an embodiment, the image data may comprise data relating to a distance between objects and the viewing point in the three dimensional scene.

In an embodiment, computationally isolating the fixation region may comprise computationally processing the subset of the image data so as to determine boundaries of at least one image object associated with the visual fixation point, isolating the at least one image object and rendering each image object on a separate depth layer.

In an embodiment, the method may further comprise a step of updating the display of the display device subsequent to each step of modification of the image.

In an embodiment, the image data may be generated by an optical device comprising a lens selected from a group comprising rectilinear camera lens, fisheye camera lens, 360° lens, multiple lenses and mechanically adjustable lens.

In an embodiment, the method may further comprise a step of computationally processing the image data so as to apply an image blur effect which progressively increases radially away from the fixation point in at least one of height, width and depth axes of the image.

In an embodiment, the method may further comprise a step of computationally processing the image data so as to overlay the image with an object seen in proximity to the face of the human observer in the three dimensional scene.

In an embodiment, capturing the user input may comprise computing a distance between the image and a head of the user. The fixation region may be computationally expanded by an amount inversely correlated with the distance between the image and the head of the user. The peripheral region may be computationally compressed by an amount positively correlated with the distance between the image and the head of the user.

In accordance with a second aspect of the present invention, there is provided a computer system configured to implement steps of the method according to the first aspect, the system comprising: user input capturing means configured to capture user input; a control unit configured to generate a processed image data based on the captured user input; a display device configured to display the processed image data.

In an embodiment, the system may further comprise image capturing means configured to capture the image data which represents a three dimensional scene.

In an embodiment, the system may further comprise a depth sensor configured to capture depth information from the three-dimensional scene and wherein the control unit is configured to process the captured image data along with the captured depth information.

In an embodiment, the user input capturing means may comprise a display device motion sensor configured to capture motion applied to the display device.

In an embodiment, the user input capturing means may comprise a user motion sensor configured to capture motion of the user relative to the display device.

In an embodiment, the user input capturing means may comprise a touchscreen configured to be integrated with the display device.

In an embodiment, the system may further comprise a graphics processor configured to process the captured image data so as to generate a modified image data.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described with reference to the accompanying drawings, in which.

Figure 1:
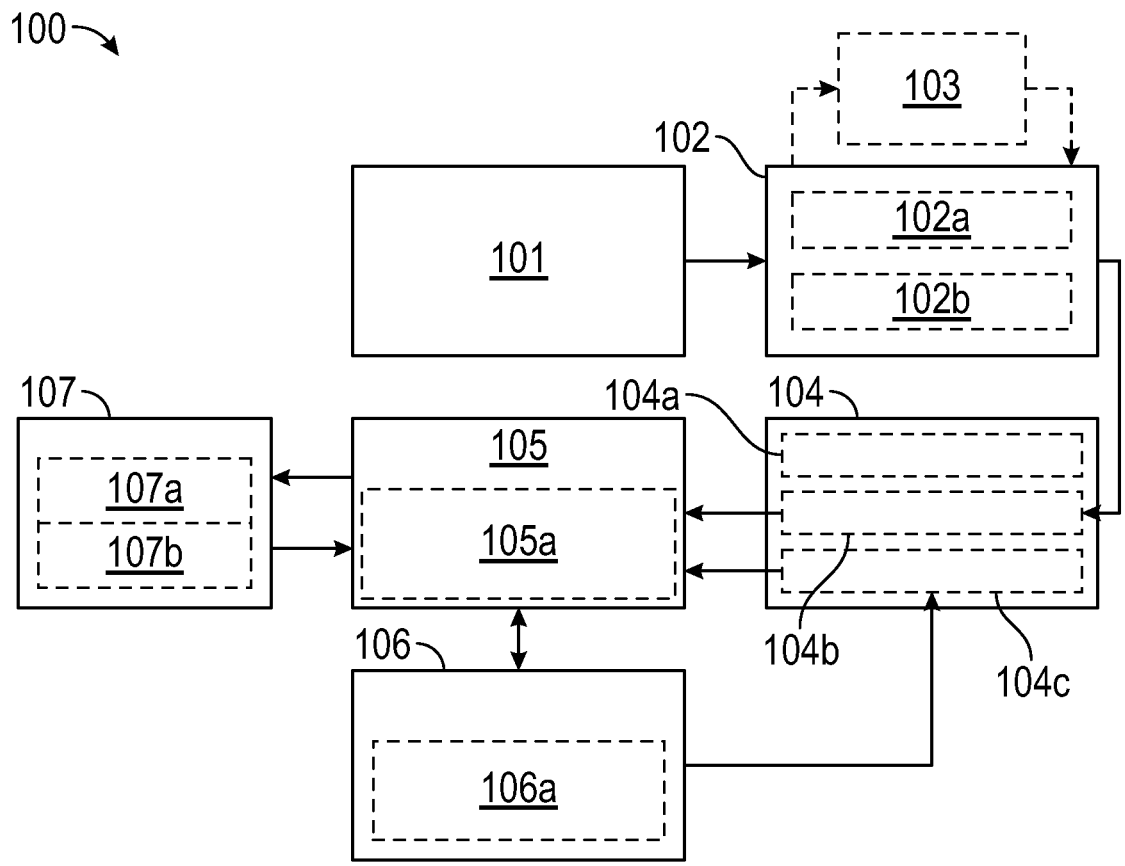
FIG. 1 illustrates a flow chart of the steps of the method of modifying an image on a computational device according to a first embodiment of the present invention.
Figure 2:
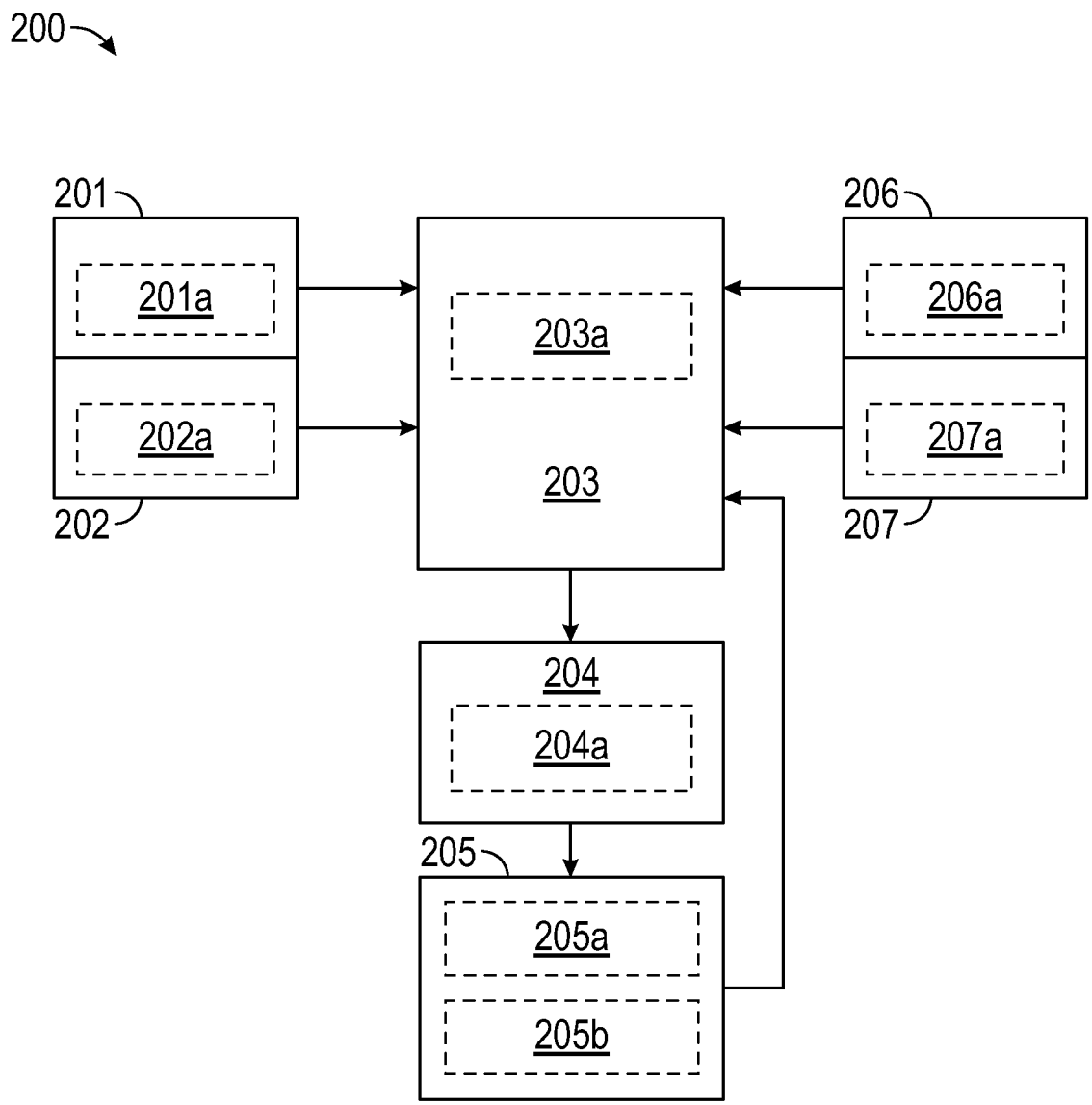
FIG. 2 illustrates a block diagram of a computer system implementing steps of the method of FIG. 1.

A method 100 of modifying an image on a computational device according to a first embodiment of the present invention will now be described with reference to FIG. 1. At step 101, the image data from the camera, camera array, and depth sensors where available, is accessed. At step 102, a fixation region 102*a* is defined as a combination of fixation coordinate, this corresponding to the point in the scene where the eye or eyes are fixating, and the fixation object, this being an object in the scene associated with the fixation coordinate. The fixation region may be selected by one of three techniques 102*b*: a default setting, by user gesture, or via the eye tracking sensor integrated into the device.

The default setting may be applied using a suitable algorithm, programmed into the device by a person skilled in the art, which selects a region in the centre of the image, or close to the centre of the image, or detects a salient feature in the image, such as a person or a face of the person, or an object in the centre of the image, and selects this as the fixation region.

The user gesture selection may be enabled by the user applying a suitable gesture to the touchscreen display, on which the image is optionally displayed at step 103. For example, the finger of the user touches an area of the touchscreen and thereby selects that point in the image as the fixation region. Moving the finger across the touchscreen moves the fixation region correspondingly.

The eye tracking selection is enabled once the image is displayed to the screen and a suitable sensor integrated into the device embodying the method detects the motion and position of the eye of the user and with respect to the display and uses the position of the gaze on the image to select the fixation region. Moving the gaze across the image moves the fixation region correspondingly.

At step 104, the image is modified according to the following way. The region of the image corresponding to the fixation region, this having been selected in a prior step, is magnified 104*a* relative to the size thereof in the original projection of the image generated by the linear perspective geometry applied to the image data from the 3D scene. The remainder of the image is minified 104*b* relative to its size in the original projection of the image generated by the linear perspective geometry applied to the image data from the 3D scene. There are several computational techniques that can be used to effect the spatial modifications specified, such as expansion (magnification) or compression (minification) in the present invention, and which could be implemented by a person skilled in the art. By way of example only, one technique is to apply a suitable mesh transformation to the 3D coordinates used to model the 3D scene, or the 2D image of the 3D scene. Another technique is to apply a suitable matrix transformation to the computer data used to represent the light paths in the 3D scene.

At step 105, the image modified according to the first embodiment is rendered to the image display, which may also be a touchscreen device. The touchscreen may provide a user interface 105*a*, in the form of buttons, sliders, switches, or similar user interface mechanisms, and by manipulating this interface the user is able to effect further modification to the image. According to the disclosed method these include further selecting or modifying the fixation region, isolating a object in the scene corresponding to the fixation region, altering the angle of view of the image, whether in the horizontal or vertical axis, rotating the image around the axis of the fixation region, or another axis as specified by the user via a suitable interface control mechanism, altering the curvature in the image, warping the image, or applying other geometrical transformations to the image. Once selected these modifications update the image on the image display in real time.

At step 106, further modifications to the image can be made in response to data passed from the sensors 106*a* integrated into the device, such as the eye tracker, head tracker, accelerometer, or gyroscope, such that the image is modified in real time in response to user behaviour, gestures, motion, or the motion of the device.

At step 107, image effects 107*a* may be applied to modify the image. These effects may be applied using an algorithm programmed into the device by a person skilled in the art, such they modify the image automatically without user intervention, or may be applied under the control of the user via a suitable interface, which may be controlled via the touchscreen. Image effects may include blur, modifications to image contrast, saturation, luminance, and resolution. Additional image effects 107*b* may be overlaid on the image automatically or under the control of the user that are designed to enhance the perceptual authenticity of the first person point of view. Items included would normally be seen in natural vision in close proximity to the eyes, and a non-exhaustive list of examples would include spectacles, sunglasses, hats, noses, jewelry, hair, body piercings, and umbrellas.

The method of modifying an image on a computational device according to a first embodiment may be embodied in a computer system 200 as illustrated in FIG. 1. Cameras or camera arrays 201 may record rays of light from a 3D scene by projecting them onto a sensor or sensors (not shown) using the geometry of linear perspective and converting them to computational data 201a representing luminance, colour, motion, etc. which may then be stored. In addition, depth information 202a from the scene can be recorded by using sensors 202, by calculating the disparity between multiple cameras, from camera motion, by applying light field capture techniques, or other techniques known to those skilled in the art, this information being converted to computational data and stored in the device. Camera lenses may be rectilinear or fisheye in construction, and the device may record a cropped region of the 3D scene or a 360° view of the 3D scene, in mono or in stereo, in a flat projection or using 3D depth information about the 3D scene, or using a light field system, or similar system for recording light arrays in a 3D scene.

The data representing the 3D scene is accessed by the Central Processor 203 and modified according to a number of steps so as to obtain a modified data 203a, discussed above with reference to FIG. 1. The modified image data 203a is passed to the Graphics Processor 204 for further modification 204a according to the steps disclosed with reference to FIG. 1, and rendered to the image display 205 which may also be a touchscreen display, so as to obtain a rendered image 205a.

Data 205b from the touchscreen display 205 generated in response to user behaviour (such as finger gestures) can be passed to the Central Processor 203 in order to initiate further modifications to the image according to steps specified with reference to FIG. 1.

The image may be further modified in response to data derived from motion sensors 206, such as gyroscopes, or accelerometers 206a integrated into the device, or from sensors 207 that detect the motion, position or behaviour of users, such as eye tracking or head tracking sensors 207a. Once modified it is passed again to the Graphics Processor 204, via the Central Processor 203, and rendered to the display 205.

The system 200 is so configured as to permit the user to continuously monitor the modified image via the display 205 and further modify its properties in real time, enabled by user gesture inputs or in response to motion, eye, or head tracking sensors 207, 207a.

Figure 3:
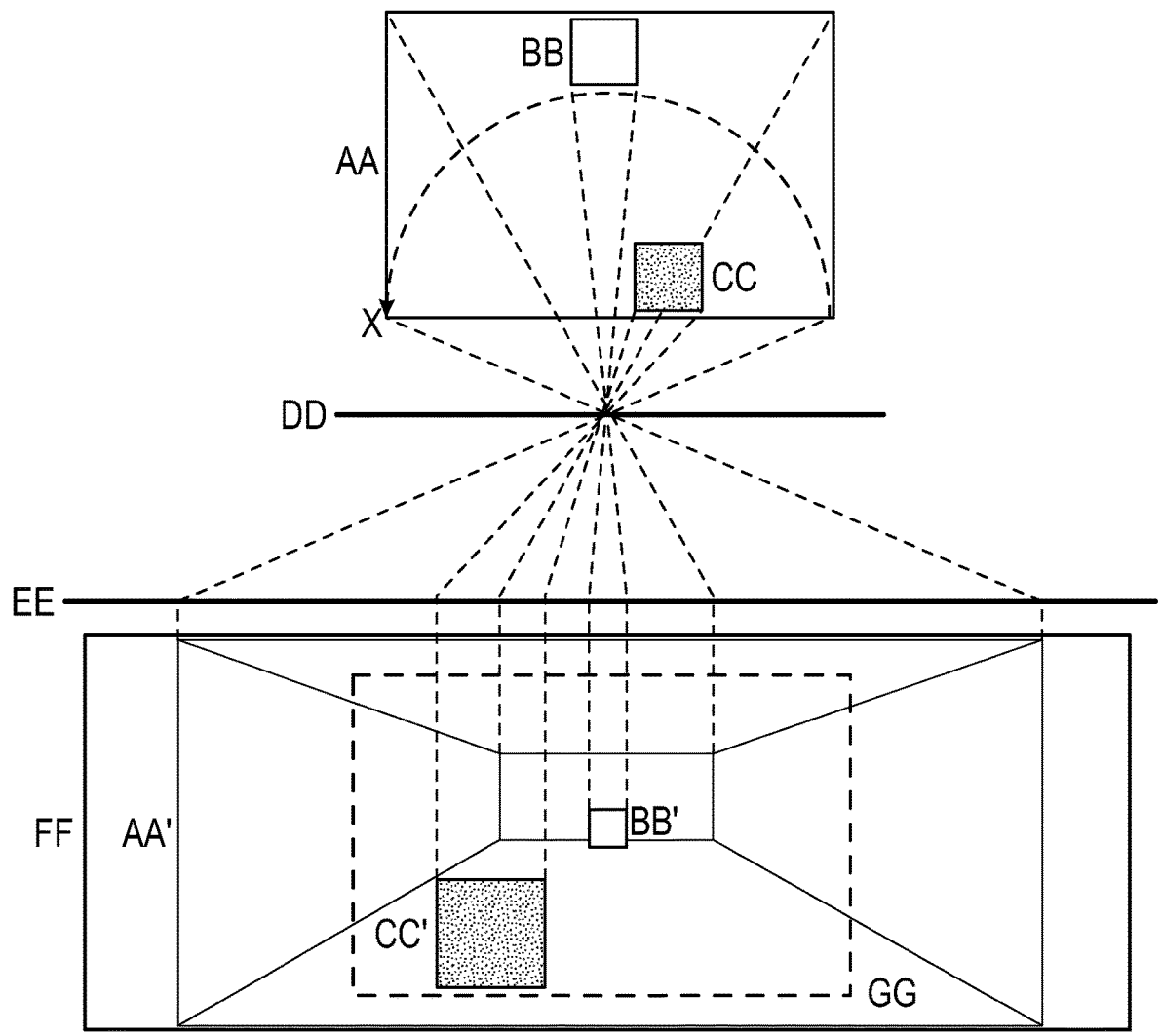
FIG. 3 illustrates an example explaining geometric principles of linear perspective.

FIG. 3 illustrates the geometric principles of linear perspective. The image on the screen at FF shows a wide-angle view (120° horizontally) of the room, which is shown in plan view at AA. Note that due to the wide angle of view of the 3D scene the cube in the room at BB appears excessively small in the image at BB', while the walls of the room appear excessively stretched at AA'. The forward-most cube at CC appears excessively large when projected to CC', and when the standard camera crop frame, indicated by the dashed line at GG, is applied much of the room falls outside the visible area. For the purposes of representing the room in a perceptually natural way, this method is inadequate.

In theory, the apparent distortions of size and shape in this image of the room could be neutralised if the viewer adopts the correct centre of the projection as the viewing point. Under these conditions the pattern of light rays entering the pupil of the eye would closely approximate those projecting from the real scene. However, for wide-angle views the centre of projection would be too close to the image plane to allow the eye of the view to focus comfortably, unless the image was made impractically large.

Figure 4:
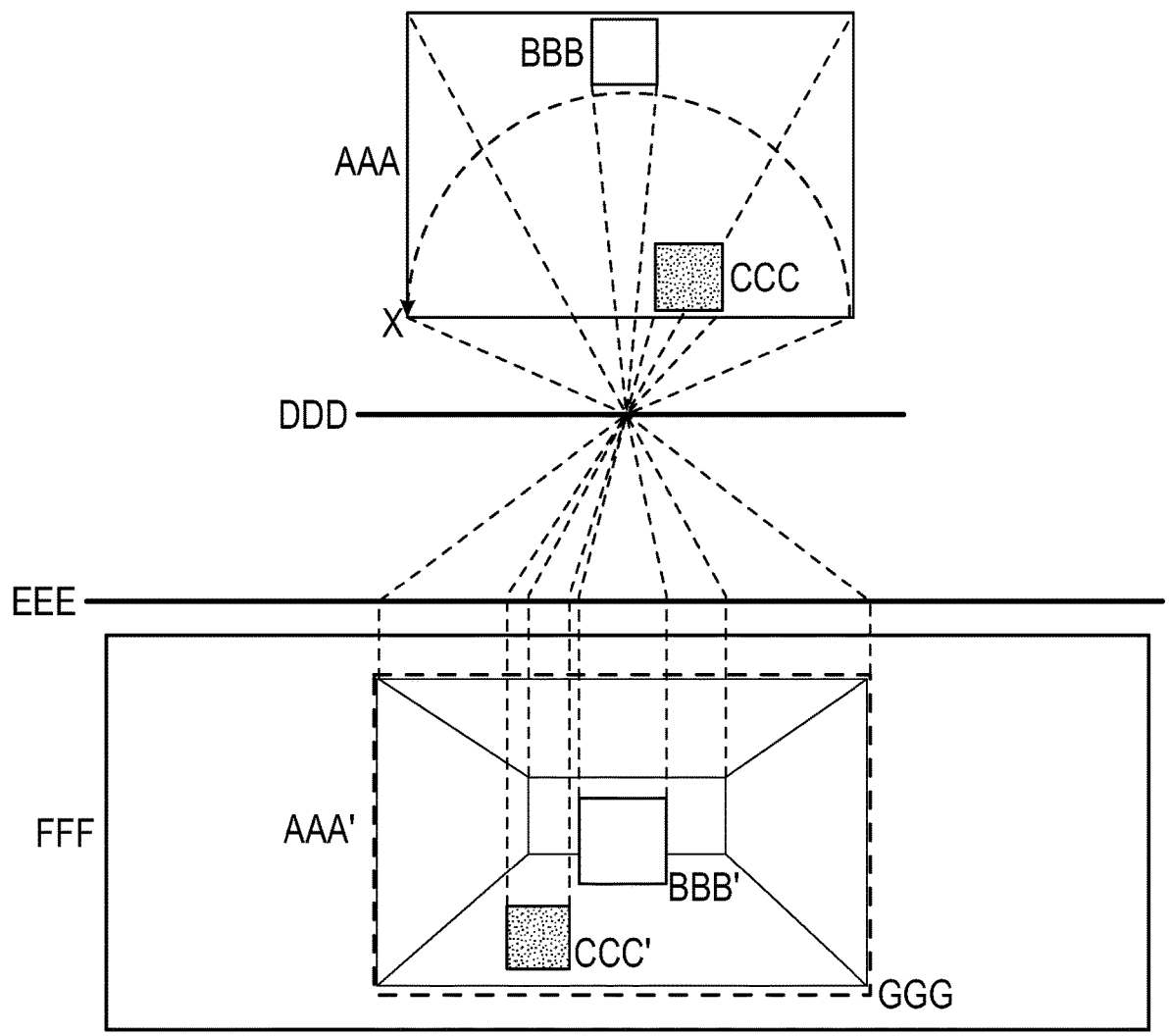
FIG. 4 illustrates the image modification according to the steps of the method of FIG. 1.

FIG. 4 illustrates the image modification principle employed in the present invention. The same room as in FIG. 3 is shown but the paths of the rays of light projected onto the image plane at EEE are different, resulting in a modified image of the 3D scene. The rays of light projecting from the cube at BBB are non-linear is a way specified in the present invention, being more divergent at the aperture than in FIG. 3, resulting in a magnification of the cube at BBB' relative to the projection in FIG. 3. The rays of light projecting from the outer edges of the room are more convergent at the aperture than in FIG. 3, resulting in a minification the outer walls of the room at AAA'. Since the cube CCC is closer to EEE than BBB, it is also minified when projected at CCC' according to the present invention. The wall behind the cube at BBB is also minified according to the present invention, and is shown in the drawing as smaller in the image at AAA' in proportion to the cube at BBB' than in FIG. 3.

Note that in the projection of the room shown in FIG. 4 the entire room is visible within the standard camera crop frame at GGG. This method results in an image of the scene that is more perceptually natural, more comfortable to view, and has greater perceptual depth than an image generated according to the geometry of linear perspective.

The degree of magnification and minification applied to the scene in the drawing is shown for the purposes of illustration only, and does not indicate the precise or only degree of modification used in a device embodying the method.

The image of the 3D space shown in FIG. 4 does not suffer some of the problems noted in images generated by the geometry of linear perspective, and is designed to improve the layout, legibility, perceptual depth, and perceptual naturalism of the image compared to the image of the 3D scene generated in FIG. 3.

Figure 5:
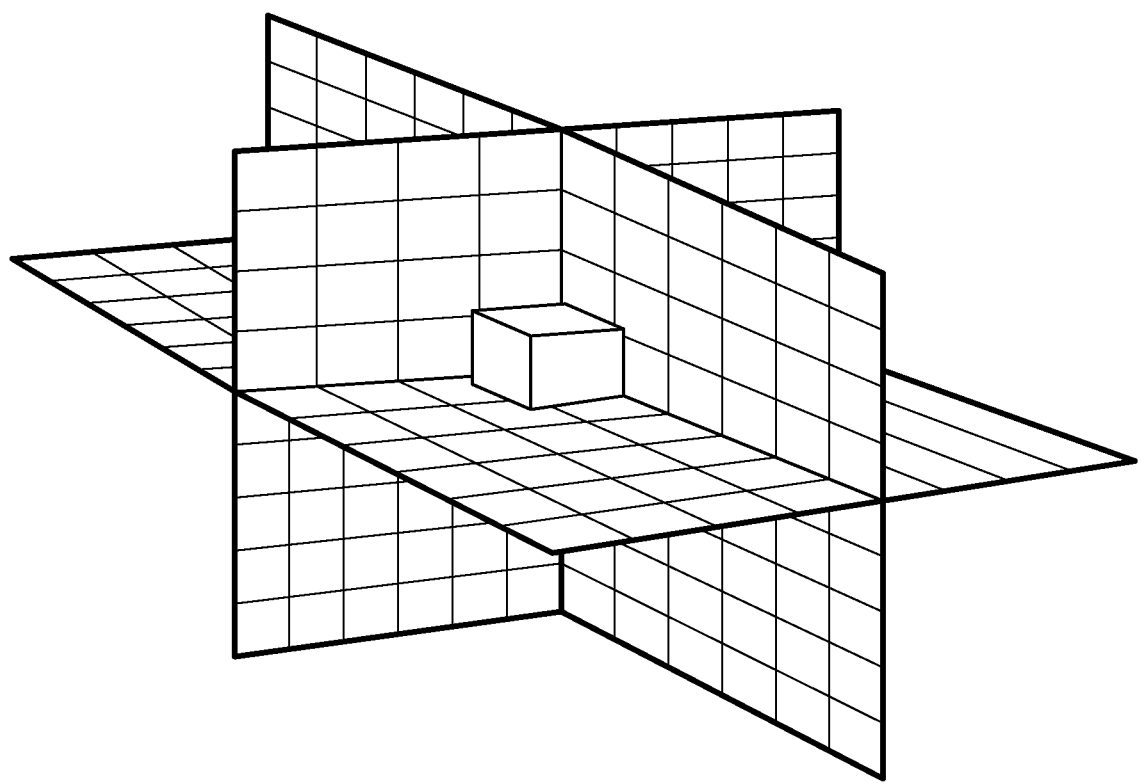
FIG. 5 illustrates a schematic representation of Euclidean space.

FIG. 5 is a schematic representation of Euclidean space. Three intersecting planes representing a 3D space are shown in an orthographic projection. Each plane is marked with evenly distributed grid lines to illustrate that principle that in Euclidean space 3D coordinates are evenly spaced throughout the volume. A standard linear perspective projection would project these coordinates to a 2D plane using straight light paths passing through an aperture and intersecting with a plane.

Figure 6:
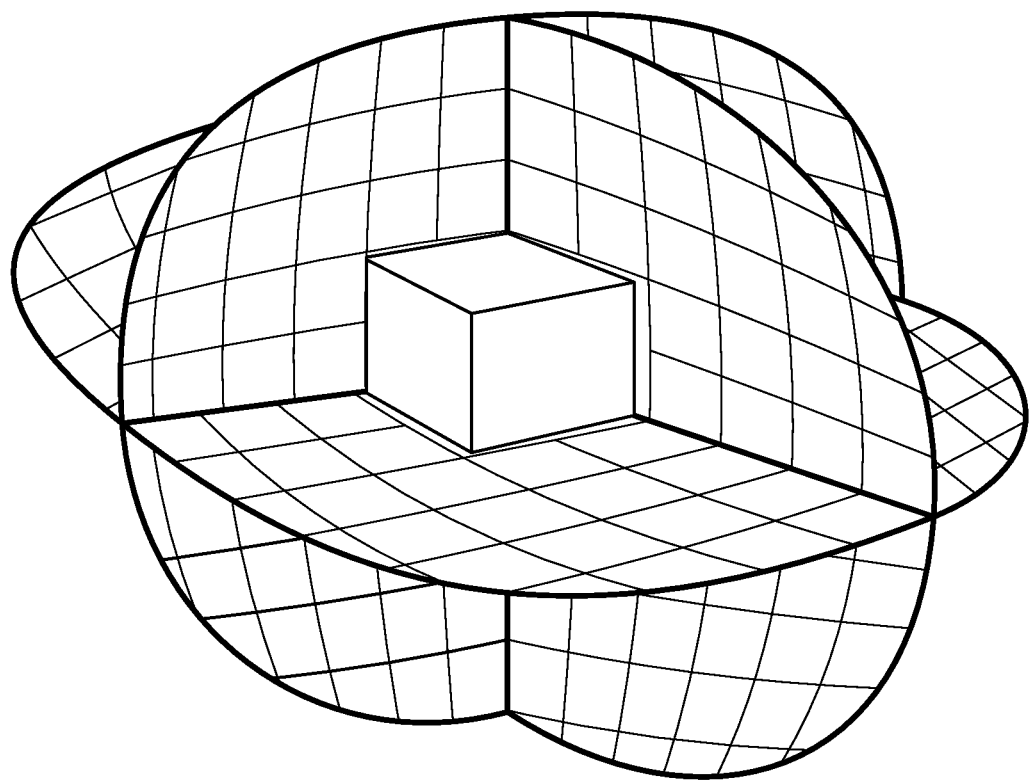
FIG. 6 illustrates a spatial modification according to the present invention.

FIG. 6 is a schematic representation of the spatial modification applied in the present invention. Three intersecting planes marked with grid lines representing a 3D space are shown in an orthographic projection, as in FIG. 5. Here the grid lines are not evenly distributed. The coordinate where all the planes intersect is taken to be the fixation point in the 3D space, and origin, and the space between the points is expanded in this region, while the space beyond this region is compressed in a way that increases as a function of distance from the origin. When this 3D space is projected to a 2D plane it produces a non-Euclidean projection of the 3D space. Note that the cube at the centre of the space is magnified in FIG. 6 when compared FIG. 5 while the space at the edges is increasingly minified.

The degree of magnification and minification applied to the scene in the drawing is shown for the purposes of illustration only, and does not indicate the precise or only degree of modification used in the present invention. By way of example, a person skilled in the art would program an algorithm into the device that controls the degree of magnification and minification either automatically or under user control.

There are several computational techniques that can be used to effect the spatial modifications specified in the present method, and which could be implemented in a device embodying the present invention by a person skilled in the art. By way of example only, one technique is to apply a suitable mesh transformation to the 3D coordinates used to model the 3D scene, or the 2D image of the 3D scene. Another technique is to apply a suitable matrix transformation to the computer data used to represent the light paths in the 3D scene.

Figure 7:
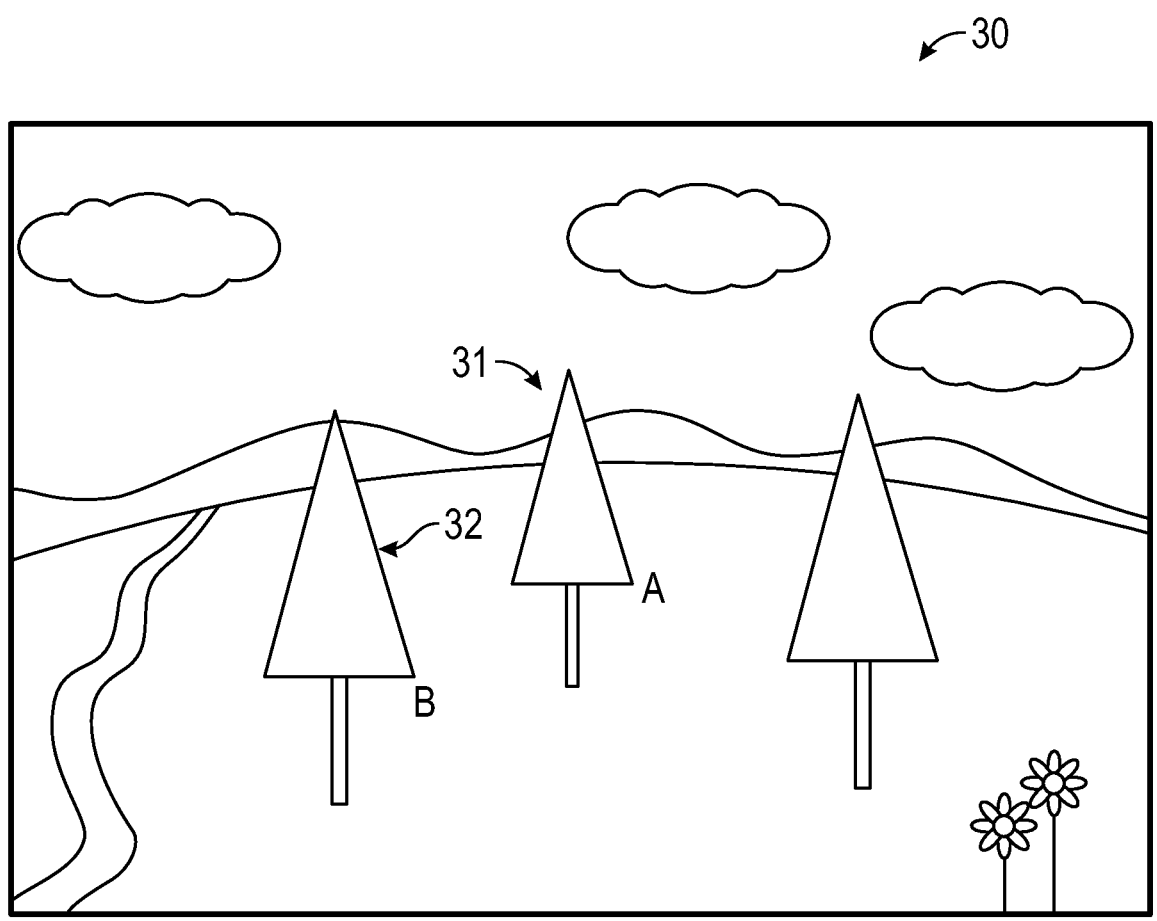
FIG. 7 illustrates a schematic representation a 3D scene generated by a linear perspective projection in a camera or similar device.

FIG. 7 shows a schematic representation 30 of a 3D scene generated by a linear perspective projection in a camera or similar device. Note that the tree 31 is identical in size to the tree 32 in the scene, but appears smaller in the image as it is further away from the projection plane. A device embodying the present invention equipped with a rectilinear lens, or equivalent optical apparatus, would generate an image of this kind.

Figure 8:
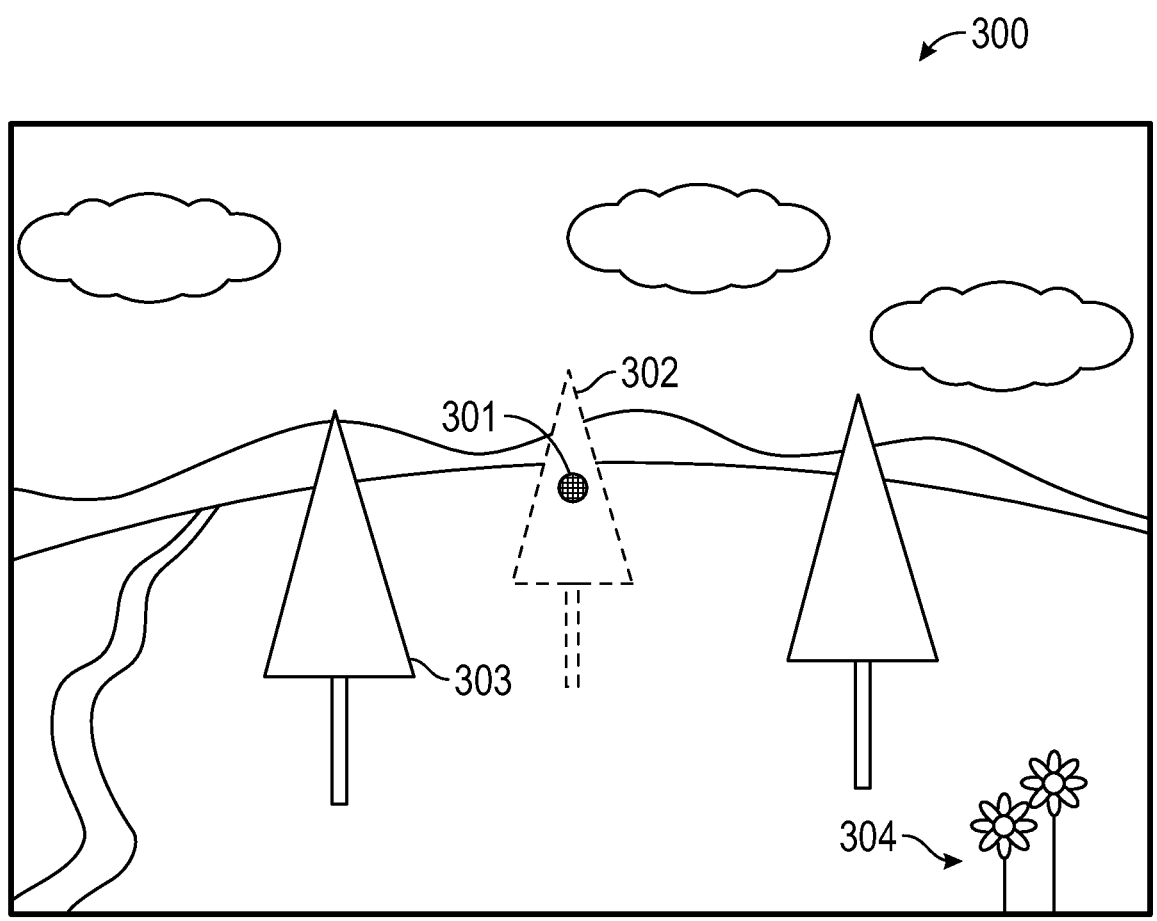
FIG. 8 illustrates an example scene showing a step of the method of FIG. 1.

FIG. 8 illustrates an example scene 300 with selecting and isolating 102 a fixation region in the image of the 3D scene 300. The pattern-filled circle 301 indicates the fixation coordinate located in the tree labelled 302, and the computational isolation of the tree from other objects in the scene is indicated by the dashed outline of the tree at 302. The fixation coordinate 301 can be selected by a number of techniques, including but not limited to: user control via the touchscreen interface; automatically by applying a suitable algorithm; in response to sensors such as eye tracking systems. By way of example, the user touches the image on the touchscreen, and the point of contact with the finger and the screen is taken as the fixation coordinate using techniques known to those skilled in the art.

The object associated with the fixation region can determined in a number of ways including but not limited to: user control via the touchscreen interface; automatically by applying a suitable algorithm; in response to sensors such as eye tracking systems. By way of example, the user draws a loop with a finger around an object in the image on the touchscreen, and an object enclosed by the loop, whether 2D or 3D, is taken as the associated object using techniques known to those skilled in the art.

The object associated with the fixation region can computationally isolated from other objects in the scene in a number of ways including but not limited to: user control via the touchscreen interface; automatically by applying a suitable algorithm; in response to sensors such as eye tracking systems. By way of example, the user draws around with a finger around the contour of an object in the image on the touchscreen, and an object enclosed by the contour, whether 2D or 3D, is taken as the isolated object, and computationally isolated using techniques known to those skilled in the art.

Figure 9:
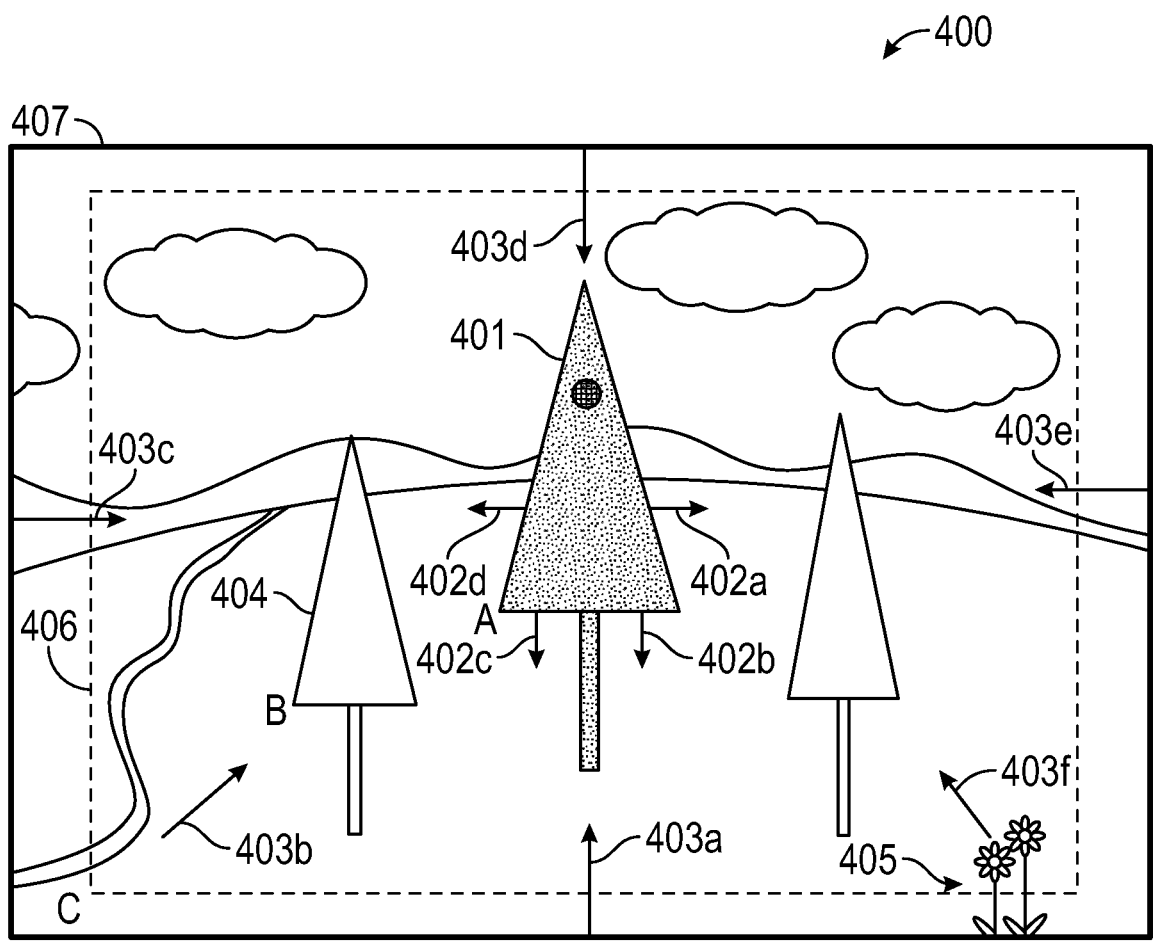
FIG. 9 illustrates another example scene showing a step of the method of FIG. 1.

FIG. 9 shows an example scene 400. The step of magnifying 104a the fixation region 301 and minifying 104b the remaining regions and objects in the scene 400 and the effects on the tree at 401 and 404, and the flowers at 405 are shown. The dashed boundary at 406 indicates the original angle of view of the image prior to modification according to the first embodiment, with the regions inside the dashed line being visible in the pre-modified version illustrated in FIG. 8. The regions outside the dashed line now become visible within the frame 407. The bold arrows 402a, 402b, 402c, 402d indicate the direction of magnification and the bold arrows 403a, 403b, 403c, 403d, 403e, 403f indicate the direction of minification.

The tree at 401, now shaded, is larger in the image than in FIG. 8 and the tree at 404 is smaller. The flowers 405 in the bottom right corner of the image, which are closer that the tree at 401, are now smaller but also visible in greater part than in FIG. 8. The dashed boundary at 406 shows the portion of the 3D scene visible within the image frame in FIG. 8, and FIG. 9 shows the additional areas of the 3D scene now visible within the image frame.

The modifications applied to the image according to the present invention are designed to improve the perceptual naturalism and depth of the image of the 3D scene, and to improve its legibility.

The degree of magnification and minification applied to the scene in the drawing is shown for the purposes of illustration only, and does not indicate the precise or only degree of modification used in a device embodying the method.

Figure 10:
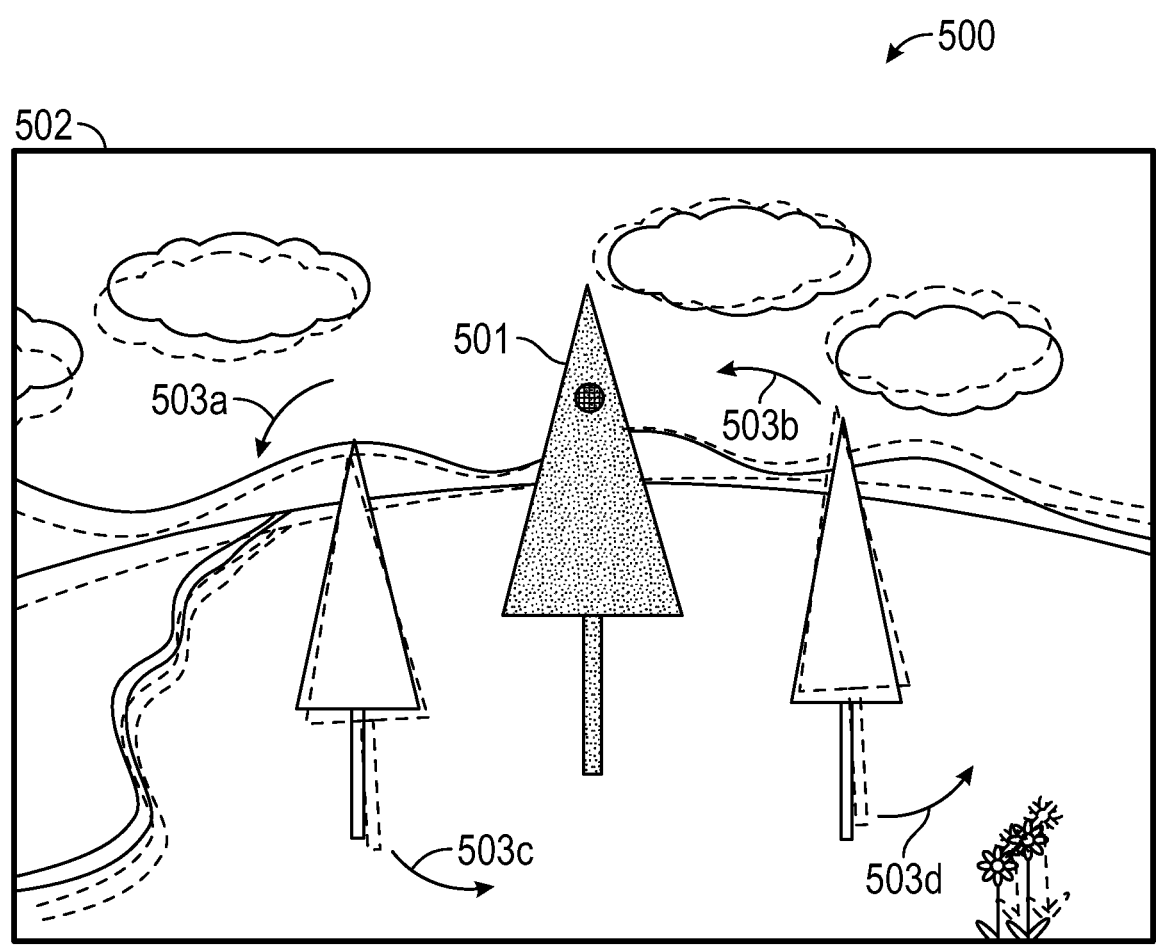
FIG. 10 illustrates an example scene showing a step of the method of FIG. 1.

FIG. 10 illustrates a scene 500 showing moving the objects lying outside the fixation region. The shaded tree at 501 is the fixation region, and remains static with respect to the image frame 502, while the remainder of the objects in the scene are moved or otherwise modified. The drawing in FIG. 10 shows, by way of example, an effect of rotation 503a, 503b, 503c, 503d about the axis of the fixation region. Other forms of motion or modification may be implemented, including but not limited to: rotation, translation, forward or backward motion, zooming, warping, or bending.

The type of motion used may be determined by the motion of the device embodying the method, and detected via a suitable sensor such as an accelerometer or gyroscope such that the motion of the image corresponds to the motion of the device, thus enabling an effect of motion parallax between the fixation region and the rest of the scene. This motion parallax effect can further enhance the perceptual depth in the image.

The type of motion used may be further determined by the eye or head movement of the user of the device embodying the method, and detected via a suitable sensor such as an eye or head tracking system such that the motion of the image corresponds to the motion of the eyes or head, thus enabling an effect of motion parallax between the fixation region and the rest of the scene.

Figure 11:
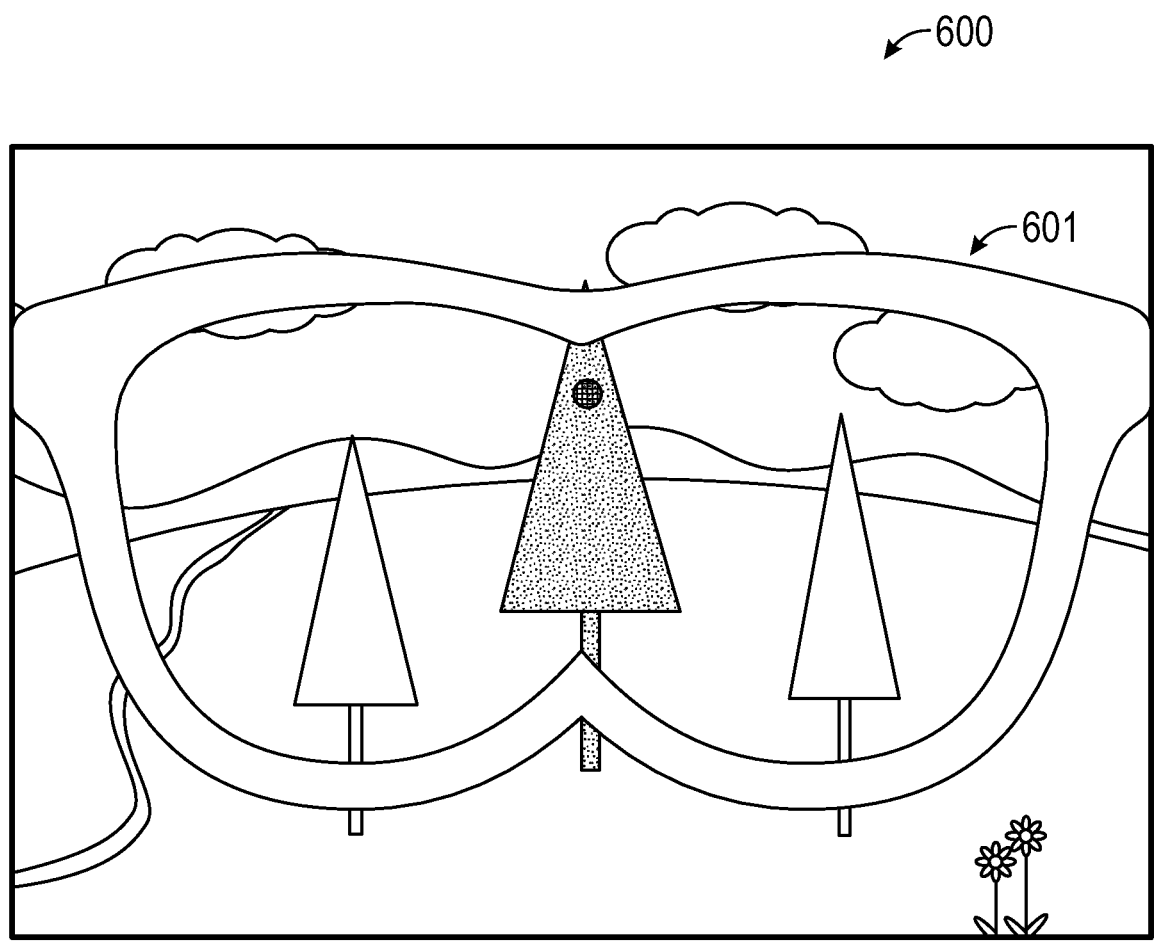
FIG. 11 illustrates an example scene showing a step of the method of FIG. 1.

FIG. 11 illustrates by way of example a scene 600 showing overlaying of image effects on the image in order to enhance the perceptual naturalism of the first person point of view represented by the image. By way of example only, the figure shows a pair 601 of spectacles overlaid on the image of the 3D scene. The figure shows the spectacles 601 as they would appear to a wearer viewing them with two eyes, the image of which is fused by the visual system in a way approximated in the drawing. The overlaid images may be rendered with image blur and transparency effects, applied with techniques known to those skilled in the art, in order to further emulate the perceptual appearance of objects seen in close proximity to the eyes. In the case of the human nose, for example, this would appear in the image with a degree of blur and transparency in the image, as it does in natural vision.

Figure 12:
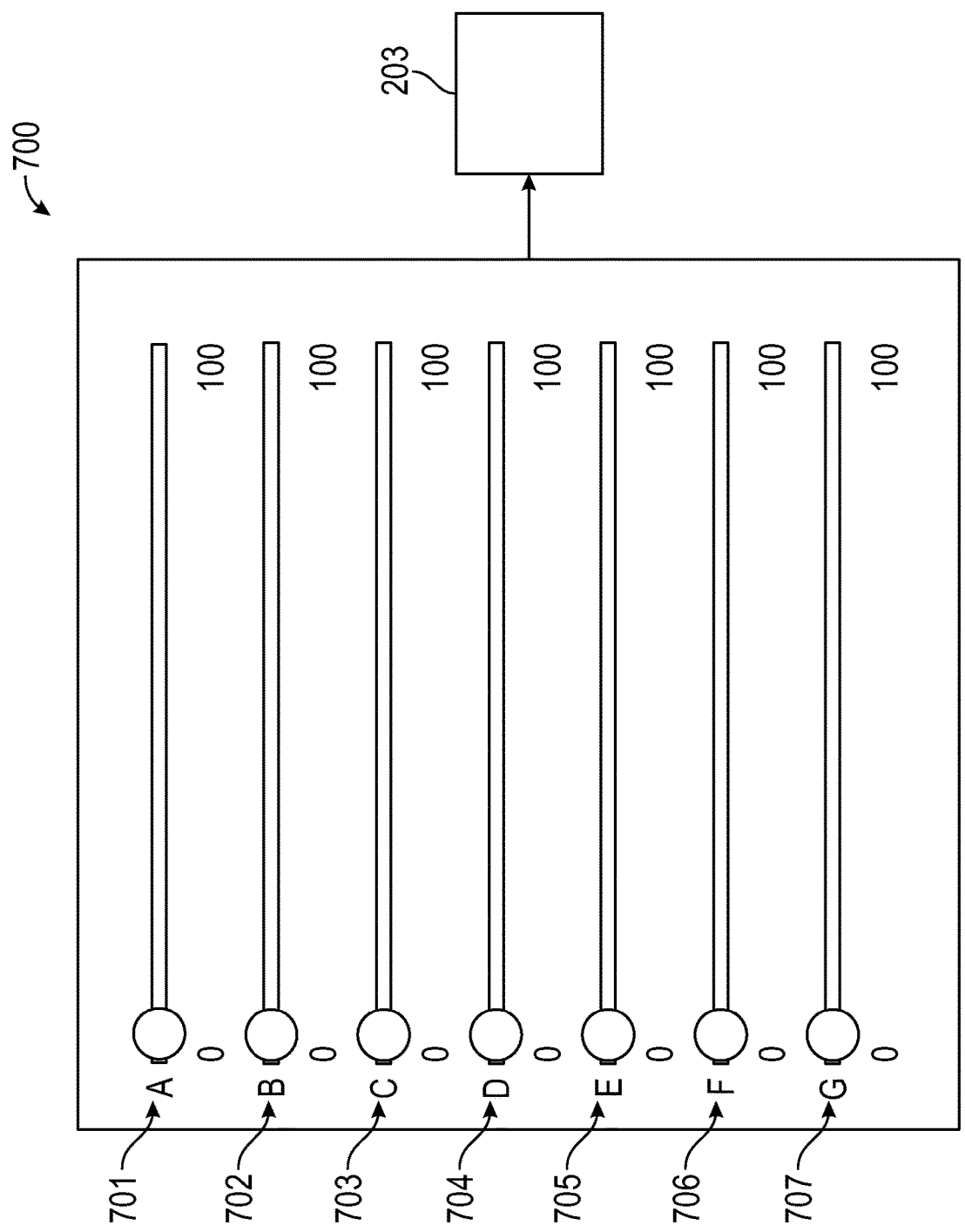
FIG. 12 illustrates an example of a User Interface to be used in an embodiment of the present invention.

FIG. 12 illustrates an example of a User Interface 700. Such an interface 700 may be equipped with a series of sliders or buttons, whether physical or virtual, that when altered send data to the Central Processor in order to effect modifications to the image or to control the behaviour of the device. In the example shown in this drawing, there are seven sliders 701, 702, 703, 704, 705, 706, 707, which can return values of between 0 and 100. By way of example, in one embodiment of the invention, slider 701 controls the size of the fixation region, with 0 being a small region and 100 being a large region; slider 702 controls degree of magnification applied to the fixation region, and slider 703 controls the degree of minification applied to the non-fixation region; slider 704 controls the angle of view of the image, with 0 being a narrow angle (<20° horizontally) and 100 being a wide angle (>170° horizontally); slider 705 controls the degree of rotation of the image, with 0-50 being a leftward rotation and 51-100 being a rightward rotation; slider 706 controls the apparent curvature in the image, 0 being no curvature and 100 being that all straight lines in the 3D scene are rendered as curves in the image, excepting lines of latitude in line of sight or lines of longitude in line of sight; and slider 707 controls which first person image overlay effect is applied, 1 being spectacles, 2 being sunglasses, 3 being noses, etc.

The invention claimed is:

1. A method of modifying an image on a computational device, the method comprising:
    providing, by a processor, image data representative of at least a portion of a three-dimensional scene, the three-dimensional scene being visible to a human observer from a viewing point when fixating on a visual fixation point within the three-dimensional scene;
    displaying, by the processor, the image by rendering the image data on a display device;
    capturing user input at the processor, wherein the user input comprises motion data representing a motion of a user relative to the display device;
    modifying, at the processor, the image by:
        computationally isolating a fixation region within the image by computationally processing a subset of image data representing an image object within the image to determine boundaries of at least one image object associated with the visual fixation point, isolating the at least one image object, and rendering the at least one image object on a separate depth layer, wherein the fixation region is defined by the subset of the image data, and wherein the image object is associated with the visual fixation point;
        spatially reconstructing the subset of image data to computationally expand the fixation region;
        spatially reconstructing remaining image data relative to the subset of image data to computationally compress a peripheral region of the image relative to the fixation region in a progressive fashion as a function of a distance from the fixation region;
        statically positioning the fixation region relative to a border of the image and moving the peripheral region relative to the fixation region in accordance with the motion of the user to emulate a motion parallax perceived by the human observer in the three-dimensional scene; and
    wherein modification of the image is modulated by the user input such that a modified image is produced which synthetically emulates how the human observer would perceive the three-dimensional scene.

2. The method of claim 1, wherein modifying the image further comprises rotating the image around an axis of the fixation region.

3. The method of claim 1, wherein modifying the image further comprises applying a geometrical transformation to the image.

4. The method of claim 1, wherein modifying the image further comprises altering an angle of view of the image in a horizontal or vertical axis of the image.

5. The method of claim 4, wherein the fixation region is computationally expanded by an amount positively correlated with the angle of view.

6. The method of claim 4, wherein the peripheral region is computationally compressed by an amount inversely correlated with the angle of view.

7. The method of claim 1, wherein modifying the image further comprises computationally isolating the fixation region in response to an indication gesture of the user.

8. The method of claim 1, wherein capturing the user input comprises monitoring a movement of eyes of the user, wherein the movement of the eyes of the user corresponds to a repositioning of the fixation point within the three dimensional scene and modifying the image comprises computationally isolating the fixation region comprising a repositioned fixation point.

9. The method of claim 1, wherein capturing the user input comprises monitoring touch gestures on a touchscreen of the display device, wherein the touch gestures correspond to a repositioning of the fixation point within the three-dimensional scene and modifying the image comprises isolating the fixation region comprising a repositioned fixation point.

10. The method of claim 1, wherein the image data comprises data relating to a distance between objects and the viewing point in the three-dimensional scene.

11. The method of claim 1, further comprising updating the display of the display device subsequent to each step of modification of the image.

12. The method of claim 1, wherein the image data is generated by an optical device comprising a lens selected from a group consisting of a rectilinear camera lens, a fisheye camera lens, a 360° lens, multiple lenses, and a mechanically adjustable lens.

13. The method of claim 1, further comprising computationally processing, at the processor, the image data so as to apply an image blur effect which progressively increases radially away from the fixation point in at least one of height, width and depth axes of the image.

14. The method of claim 1, further comprising computationally processing, at the processor, the image data to overlay the image with an object seen in proximity to a face of the human observer in the three dimensional scene.

15. The method of claim 1, wherein capturing the user input comprises computing, at the processor, a distance between the image and a head of the user.

16. The method of claim 15, wherein the fixation region is computationally expanded by an amount inversely correlated with the distance between the image and the head of the user.

17. The method of claim 15, wherein the peripheral region is computationally compressed by an amount positively correlated with the distance between the image and the head of the user.

18. A computer system comprising:
    user input capturing means configured to capture user input;
    a display device configured to display processed image data;
    one or more processors; and
    memory storing thereon instructions that as a result of being executed by the one or more processors cause the computer system to:

provide image data representative of at least a portion of a three-dimensional scene, the three-dimensional scene being visible to a human observer from a viewing point when fixating on a visual fixation point within the three-dimensional scene;

render the image data on to the display device to display an image;

capture, via the user input capturing means, the user input, wherein the user input comprises motion data representing a motion of a user relative to the display device; and modify the image by:

computationally isolating a fixation region within the image by computationally processing a subset of image data representing an image object within the image to determine boundaries of at least one image object associated with the visual fixation point, isolating the at least one image object, and rendering the at least one image object on a separate depth layer, wherein the fixation region is defined by the subset of the image data, and wherein the image object is associated with the visual fixation point;

spatially reconstructing the subset of image data to computationally expand the fixation region;

spatially reconstructing remaining image data relative to the subset of image data to computationally compress a peripheral region of the image relative to the fixation region in a progressive fashion as a function of a distance from the fixation region;

statically positioning the fixation region relative to a border of the image; and moving the peripheral region relative to the fixation region in accordance with the motion of the user to emulate a motion parallax perceived by the human observer in the three-dimensional scene; and, wherein modification of the image is modulated by the user input such that a modified image is produced that synthetically emulates how the human observer would perceive the three-dimensional scene.

19. The system of claim 18, further comprising an image capturing means configured to capture the image data which represents the three-dimensional scene.

* * * * *